J. F. RICHARDSON.
TELEGRAPHY.
APPLICATION FILED JAN. 11, 1907.
938,337.
Patented Oct. 26, 1909.
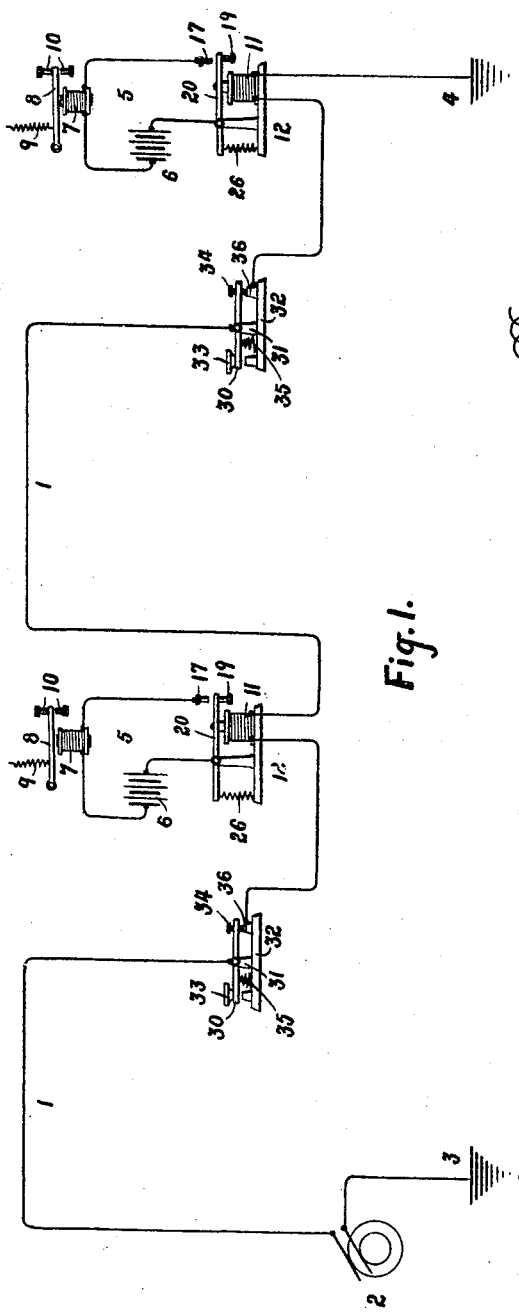
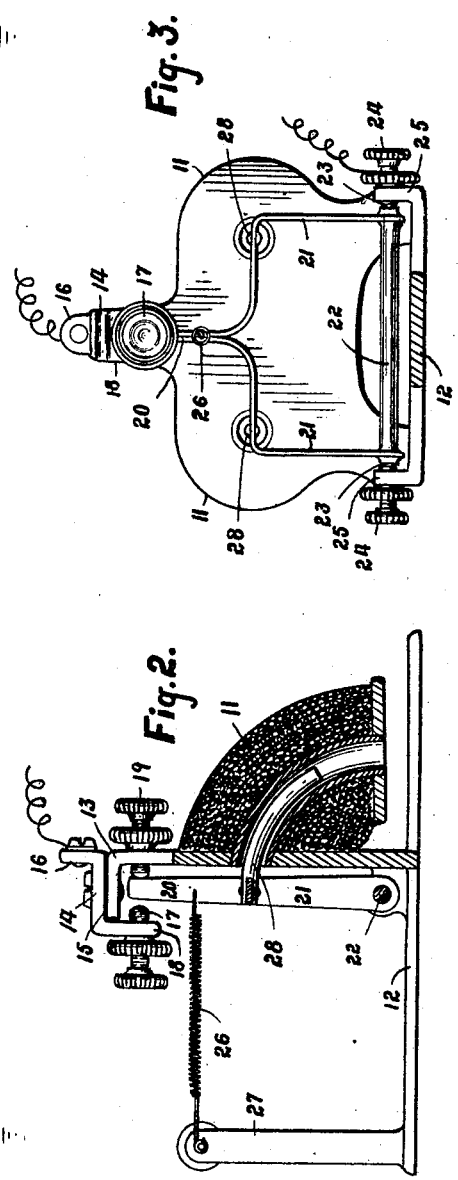
Witnesses.
Lloyd Blackmore
G. H. Tresidder
Inventor.
J. F. Richardson
by
C. J. Fetherstonhaugh atty.

UNITED STATES PATENT OFFICE.

JOHN FRANKLIN RICHARDSON, OF MONTREAL, QUEBEC, CANADA.

TELEGRAPHY.

938,337.  Specification of Letters Patent.  Patented Oct. 26, 1909.

Application filed January 11, 1907. Serial No. 351,873.

*To all whom it may concern:*

Be it known that I, JOHN FRANKLIN RICHARDSON, of 214 Mance street, in the city of Montreal, in the district of Montreal, in the Province of Quebec, in the Dominion of Canada, a subject of the King of Great Britain, have invented certain new and useful Improvements in Telegraphy, of which the following is a specification.

This invention relates to improvements in means for utilizing alternating electric current in telegraphy as described in the present specification and illustrated by the accompanying drawings that form part of the same.

The invention consists essentially in the novel arrangement and construction of telegraph lines and parts incidental thereto, whereby an alternating current is utilized in the transmission of electricity throughout the line circuit for governing the connections to the means for operating the receivers.

The objects of the invention are to eliminate the use of direct electric current as the main power in telegraphic work, thereby effecting a great saving in the consumption of electric current and to provide a simple and better long distance means for the transmission of messages by wire.

In the drawings, Figure 1 is a diagrammatic view showing two stations and the line circuit connecting said stations. Fig. 2 is an enlarged sectional elevation of the relay instrument. Fig. 3 is an enlarged front elevation of the relay instrument illustrated in Fig. 2.

Referring to the drawings, 1 is the line circuit emanating from the alternator 2 and grounded at 3 and 4, as customary in telegraphic line circuits. In place of using a direct current in the line circuit, the alternating current generated by the alternator 2 flows throughout the said line circuit and forms the means of operating the telegraph system.

5 are local station circuits energized by the batteries 6.

7 are electro-magnets and 8 are pivoted armatures spring-held by the springs 9 against the electrical pull of the electro-magnets 7, the free end of the armatures 8 extending between the adjustable stops 10, as customary in telegraphic instruments.

The electro-magnets 7 and the armatures 8 constitute the receiving instrument, or what are commonly termed sounders, and it will readily be seen that on the energization of the local station circuits 5 the electrical pull of the magnets 7 will draw the armatures to said magnet and at the same time bring the end of said armatures into contact with the adjustable stops and thus produce the sound necessary for signals and telegraphic work.

11 are solenoids of substantially arc-shaped form having their windings included in the line circuit 1 and mounted on suitable bases 12.

13 is a shoe extending upwardly from the solenoid frame and having a threaded orifice therethrough.

14 is a plate supported by the shoe 13 and firmly secured thereto and insulated therefrom by the insulation 15 and forming an electrical conductor, being electrically connected from the off-set 16 to the local station circuits 5 and having the thumb screw contact 17 turning in the correspondingly threaded orifice in the off-set 18. The thumb screw 19 opposes the contact thumb screw 17 and serves as a stop. The particular construction of these thumb screws will not be described at length in this specification as they are not new to this class of instrument.

20 is a contact finger extending upwardly from the yoke 21, said yoke being joined at its lower ends by the spindle 22. The spindle 22 at each end thereof is journaled on the pivot point bearings 23 and the said bearings are formed on the inwardly projecting ends of the thumb screws 24, which are inserted in corresponding threaded orifices in the upwardly projecting lugs 25. The contact finger 20 extends upwardly between the contact 17 and the stop 19. The spiral spring 26 is adjustably secured to the post 27 and to the finger 20 intermediate of the length of said finger and exerts a constant pull on the said finger to the contact 17, while the arc-shaped solenoid cores 28, secured to the yoke 21, exert a constant electrical pull on the said finger to the stop 19.

The contact finger 20 and the yoke 21 are in electrical connection, so that any current flowing through the finger 20 reaches the lower end of the yoke and consequently a thumb screw 24 which is connected with the local station circuit 5. The solenoids 11 thus control the opening and the closing of the local station circuits 5, and as the said solenoids are included in the line circuit 1 any interruption in the said line circuit will at once affect the electrical pull of said solenoids on their cores. The mechanical pull on the said solenoid cores is suitably adjusted in relation to said electrical pull and on any stop of the flow of current occurring in the line circuit, the said mechanical pull will draw the finger over to the contact 17, the finger 20 thus brought over into an electrical connection with the contact 17 forms with the yoke the electrical connection necessary to close the local station circuits 5 and on the closing of said local station circuits, the direct current from the batteries 6 flows in said circuits and energizes each magnet 7, said magnet effecting an electrical pull on the armatures 8 and drawing the same to the stop to produce the necessary signal.

On closing line circuit, the solenoids exercise an electrical pull on the cores, which is greater than the mechanical pull drawing the said finger 20 to the stop 19 and thus breaking the local station circuits 5 and releasing the electrical pull on the armatures 8 permitting said armatures to move to the upper of the adjustable stops 10.

The break in the line circuit 1 is made by what is called a transmitting instrument formed of an arm 30 pivoted centrally in the lugs 31 on the base 32. The said arm having the key 33 at one end and the adjustable thumb screw contact 34 inserted through a correspondingly threaded orifice at the other end.

The cushion spring 35 under the forward end of the arm 30 retains the contact 34 in electrical connection with the contact 36 on the base, the said contact 36 being electrically connected with the wire of the line circuit. The wire of the line circuit is also connected to the arm 30, which forms a conductor through the said instrument connecting the wires of said line circuit, consequently any pressure on the key 33 against the upward spring pressure of the cushion spring 35 separates the contacts 34 and 36, thus breaking the line circuit and interrupting the flow of alternating current therethrough and releasing the electrical pull on the solenoid core with the result, as explained above. The use of alternating current as the main source of power in telegraphy is thus successfully accomplished, for the flow of alternating current throughout the line circuit will in no way affect the sounders, as the armatures thereof are not connected with the said line circuit during their operation or otherwise, therefore the sounding instruments will give forth a perfect signal, the movement of the armatures being induced by a flow of direct current through the said local station circuits.

In the matter of economy, it is well known that for all electrical purposes, the aim is to use the alternating current as the power and in telegraphy where the consumption of current is considerable, the saving will be very great, particularly in long telegraph lines, and in this invention, the adoption of the alternating current as the power is made without in any way reducing the effectiveness of the instruments.

A feature of this invention is the multiplication of stations possible through the operation of the instruments in series in the line circuit, thus bringing the alternating current into practical use for all telegraph lines.

What I claim as my invention is:

1. In means for utilizing alternating electric current in telegraphy, in combination, a base, an arc-shaped solenoid mounted thereon, an arc-shaped core, a switch contact, a switch pivoted on said base and joined to said core, a spring normally at tension and adapted to draw said switch to said contact, and a main line circuit normally energized by alternating electric current and creating said tension of the spring, substantially as described.

2. In means for utilizing alternating electric current in telegraphy, in combination, a base, an arc-shaped solenoid having arc-shaped cores and a pivoted member mechanically pulling against the electrical pull of said solenoids and closing a local circuit on the release of said electrical pull, substantially as described.

3. In means for utilizing alternating electric current in telegraphy, the combination with an alternator and a main line circuit energized thereby, of a plurality of solenoids arranged in series in said circuit, said solenoids having arc-shaped bodies and arc-shaped cores, a frame supporting said solenoid and having a bracket portion at its upper end, an adjustable screw stop toward the upper end of said frame and extending therethrough, a conducting member, supported on said bracket portion and insulated therefrom, an adjustable screw contact extending through said conductor, a base supporting said frame and having upwardly projecting lugs therefrom, adjustable pivot point bearings arranged in said lugs, a spindle journaled in said bearings, a yoke rigid with said spindle connected to said solenoid cores and forming a switch having a contact co-acting with the aforesaid contact, and a spring rigidly held and connected to said yoke and exerting a constant pull thereon, substantially as described.

Signed at the city and district of Montreal, in the Province of Quebec, in the Dominion of Canada, this 8th day of January 1907.

JOHN FRANKLIN RICHARDSON.

Witnesses:
LLOYD BLACKMORE,
G. H. TRESIDDER.